Aug. 31, 1965   J. P. PIERRY ETAL   3,203,260
INTERCHANGEABLE HYDRO-DYNAMIC SPIN BEARINGS
Filed June 5, 1962
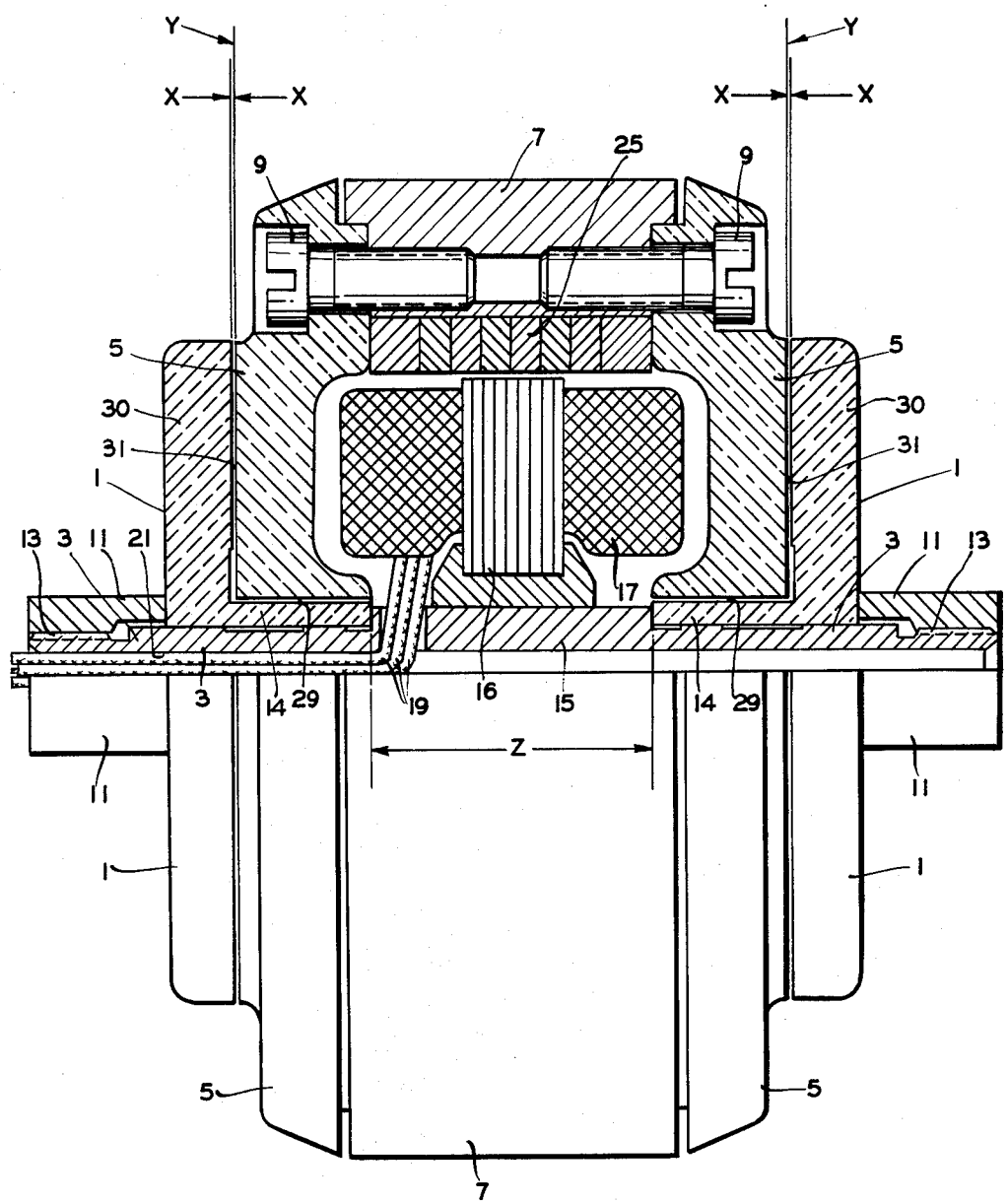
INVENTOR.
JOSEPH P. PIERRY
HOWARD E. SCHULIEN
BY Herbert L. Davis
ATTORNEY

3,203,260
INTERCHANGEABLE HYDRO-DYNAMIC SPIN BEARINGS
Joseph P. Pierry, Lodi, and Howard E. Schulien, Montville, N.J., assignors to The Bendix Corporation, Teterboro, N.J., a corporation of Delaware
Filed June 5, 1962, Ser. No. 200,241
5 Claims. (Cl. 74—5.7)

This invention relates to hydro-dynamic spin bearings and more particularly to pneumatic bearings adapted to support the rotor element of a gyroscopic motor and to an arrangement permitting the bearing elements to be interchangeably assembled in operative relation to an electric motor driven rotor of a gyroscope.

In the bearing assembly of a rotor element of a gyroscope for use in guidance and navigational equipment, one of the major problems has been the development of an interchangeable hydro-dynamic spin bearing arrangement to effectively increase the life of the gyro motor by providing an arrangement in which there is no material to material bearing contact and thus no running contact friction and an assemblage such that extended operating life may be achieved. Further, it has been found desirable to provide a basic bearing assembly in which the several elements thereof may be interchangeable so as to allow the separate manufacture of the hydro-dynamic bearing elements and the ready interchangeable assembly of these bearing elements as needed.

It is, therefore, an object of the invention to provide a novel arrangement in which hydro-dynamic spin bearings for a rotor element may be interchangeably assembled.

Another object of the invention is to provide a novel structural arrangement in which the inner race elements of a hydro-dynamic spin bearing are mounted on a rotor shaft of a gyroscope by releasable locking nuts while outer race elements of the hydro-dynamic spin bearings are secured to a flywheel of the gyroscopic motor by releasable fastening bolts.

Another object of the invention is to provide in the aforenoted arrangement novel means whereby a lubricating film of air, or hydro-dynamic wedge, may be created by relative motion of outer race elements of a flywheel with respect to inner race elements mounted on the rotor shaft of a gyroscope so as to create load carrying pressures on an air film between the outer race elements and the inner race elements at a journal provided on the shaft and other load carrying pressures on an air film between the outer race elements and the inner race elements which include thrust plates in the form of vaned pads of conventional structure secured to the rotor shaft to effect the hydro-dynamic wedge upon the relative rotation of the outer and inner race elements.

These and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

The drawing is a side view of a gyroscopic electric motor and rotor element shown partially in section and illustrating the structure of the invention.

Referring to the drawing, there are shown inner race elements 1 mounted on a shaft 3 and arranged in mating relation to outer race elements 5 which are secured to a flywheel or rotor member 7 by releasable fastening bolts 9. The inner race elements 1 are secured to the rotor shaft 3 by means of locking nuts 11 screw threadably engaged at 13 to the shaft 3 so as to force journal portions 14 of inner race elements 1 into locking relation with a raised portion 15 of shaft 3. The rotor shaft 3 may be mounted in conventional manner within a rotor casing, not shown, of a gyroscope.

The inner and outer race elements 1 and 5 may be formed of a suitable material, such as a gem-hard aluminum oxide ceramic, to provide dimensional stability under extreme temperature changes.

There is further affixed to the raised portion 15 of the shaft 3 an electric motor element 16 having suitable windings 17 and electrical conductors 19 leading therefrom and through a hollow portion 21 in the rotor shaft 3 to the exterior, as shown in the drawing. The motor element 16 cooperates with motor members 25 of a suitable magnetic material affixed to the flywheel 7 so as to rotatably drive relative to the shaft 3 the flywheel 7 and the outer race elements 5 secured thereto by fastening bolts 9.

Hydro-dynamic lubrication in the described gyro motor assembly is based on the load carrying capacity of fluid films of extremely small cross section and in the subject device there is utilized air as a lubricant. A lubricating film of air, or hydro-dynamic wedge, is created by relative motion of the outer race elements 5 of the flywheel 7 with respect to the inner race elements 1, thus creating load carrying pressures in an air film at 29 between the outer race elements 5 and the journal portions 14 of the inner race elements 1, while a further lubricating film of air, or hydro-dynamic wedge is created by the relative motion of the outer race elements 5 of the flywheel 7 with respect to thrust plates 30 of the inner race elements thus creating load carrying pressures in a fluid air film at 31.

The inner race elements 1 include the thrust plates 30 of vaned pads of conventional structure such as to create the hydro-dynamic wedge upon rotation of the race elements 5 relative thereto.

In the described arrangement, dimensions marked "X—X" are in the order of thirty-five millionths (.000035) of an inch to effect the desired operation. If the air gap "X—X" is too large, the thrust plate 30 (either one or both, if necessary) may be removed and surface Z of the raised portion 15 of the shaft 3 which normally abuts an end of the journal portion 14 of the thrust plate 1 may be lapped so that the air gap "X—X" may be effectively diminished to the desired dimension upon the thrust plate 30 being repositioned in place.

On the other hand, if the air gap "X—X" is too small, the thrust plate 30 (either one or both, if necessary) may be removed and the surface "Y" of the outer race 5 lapped so that the air gap "X—X" may be effectively increased to the desired dimension.

In the aforenoted arrangement when selecting the desired motor hydro-dynamic spin bearings 1 and 5, the life of the unit, load carrying capacity, and qualification test limits would, of course, be the governing factors in determining the size of the bearing selected. In the case of the selection of bearing elements such as ball bearings which, for example, may be designed by "R1," "R2," etc., the same may be so classified that each classification may indicate a definite geometric configuration, and load carrying capacity. Likewise, in the case of hydro-dynamic spin bearing elements, such as disclosed, the same may be classified by a designation such as "H1," "H2," etc. and in which, each classification likewise may indicate a definite geometric configuration, and load supporting fluid film.

Moreover, in the aforenoted arrangement, the hydro-dynamic bearings, inner and outer race elements 1 and 5, are matched in pairs similar to the matching of roller bearings. Also, the hydro-dynamic bearings, inner and outer race elements 1 and 5, may be classified similar to the present ball bearings designation. Thus permitting the manufacture of hydro-dynamic spin bearings separate from the manufacture of the rotor, and allowing the selection of these bearing elements 1 and 5 according to the design requirement for the motor of the gyroscope or other rotary device.

In such arrangement, the inner race elements 1 may be conveniently assembled and disassembled from the shaft 3 by locking nuts 11 threadably engaged at 13 on the shaft 3 while the outer race elements 5 may be conveniently assembled and disassembled in relation to the flywheel 7 through the operation of the fastening bolts 9.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. In a gyroscopic rotor means of a type including a shaft, an electric motor mounted on said shaft, and a flywheel driven by said electric motor; the improvement comprising inner race elements, said shaft including a raised portion, said inner race elements including journal portions arranged in abutting relation to the raised portion of said shaft, and said inner race elements including thrust plate portions, outer race elements positioned between the thrust plate portions and arranged in spaced relation to the journal portions and the thrust plate portions of said inner race elements, said inner and outer race elements cooperating to effect a hydro-dynamic wedge therebetween upon relative rotation thereof so as to provide a lubricating film of air between the inner and outer race elements, first means to releasably secure said inner race elements in said abutting relation to the raised portion of said shaft, and second means to releasably secure said outer race elements to said flywheel, and said first and second releasable means being so arranged as to permit a variance in the spaced relation between said outer race elements and the thrust plate portions of said inner race elements.

2. In a gyroscopic rotor means of a type including a shaft, an electric motor mounted on said shaft, and a flywheel driven by said electric motor; the improvement comprising inner race elements, said shaft including a raised portion, said inner race elements including journal portions arranged in abutting relation to the raised portion of said shaft, said inner race elements including thrust plate portions, outer race elements positioned between the thrust plate portions and arranged in spaced relation to the journal portions and the thrust plate portions of said inner race elements, said inner and outer race elements cooperating to effect a hydro-dynamic wedge therebetween upon relative rotation thereof so as to provide a lubricating film of air between the inner and outer race elements, first fastening means to releasably secure the inner race elements to said shaft in said abutting relation to said raised portion of the shaft, and second fastening means to releasably secure the outer race elements to said flywheel, and said first and second means being operative to disassemble said inner race elements from said shaft and said outer race elements from said flywheel so as to permit replacement thereof of the same or a different sized inner and/or outer elements to provide for an effective variance in the thickness of the lubricant film of air between said inner and said outer elements.

3. In a gyroscopic rotor means of a type including a shaft, an electric motor mounted on said shaft, and a flywheel driven by said electric motor; the improvement comprising inner race elements, said shaft including a raised portion, said inner race elements including journal portions arranged in abutting relation to the raised portion of said shaft, and said inner race elements including thrust plate portions, outer race elements positioned between the thrust plate portions and arranged in spaced relation to the journal portions and the thrust plate portions of said inner race elements, said inner and outer race elements cooperating to effect a hydro-dynamic wedge therebetween upon relative rotation thereof so as to provide a lubricating film of air between the inner and outer race elements, first means to releasably secure said inner race elements in said abutting relation to the raised portion of said shaft, and second means to secure said outer race elements to said flywheel, and said first releasable means being so arranged as to permit a variance in the spaced relation between said outer race elements and the thrust plate portions of said inner race elements.

4. In a device of a type including a shaft, a motor mounted on said shaft, and a flywheel driven by said motor; the improvement comprising inner race elements mounted on the shaft, including a pair of opposed vaned pads longitudinally spaced, coaxial to and extending radially outwardly of said shaft, and opposed journal portions longitudinally spaced along said shaft integral to each of said vaned pads, and coaxial to and extending inwardly of said vaned pads, said shaft including a raised central portion interposed between, and arranged in abutting relation to the opposed journal portions of said inner race, outer race elements spaced from and interposed between the vaned pads longitudinally along the shaft, coaxial to and radially spaced from the journal portions of said inner race, and means for releasably fastening the vaned pads and the integral journal portions against the raised portion of said shaft to permit disassembly and assembly of a different sized inner and outer race element whereby a variance in the spaced relation between said outer race elements and said inner race elements can be obtained.

5. The structure of claim 4 wherein said opposed journal portions of said inner race includes cylindrical outer surfaces facing said outer race, and its vaned pads having opposed faces in a plane substantially perpendicular to the cylindrical outer surfaces of said journal portions, and said outer race having cylindrical inner surfaces spaced from, coaxial to, and facing said cylindrical outer surfaces of said journal portions, and said outer race having opposed outwardly directed surfaces substantially perpendicular to its cylindrical inner surfaces and spaced from the opposed surfaces of the vaned pads of said inner race, whereby said inner race and said outer race may be disassembled by said releasable fastening means for removal of a predetermined amount of material from said surfaces to effectively vary the space relationship between said surfaces upon reassembly of said inner race to said outer race.

References Cited by the Examiner
UNITED STATES PATENTS

| | | | |
|---|---|---|---|
| 2,474,072 | 6/49 | Stoner | 74—5.7 |
| 2,617,695 | 11/52 | Tauscher et al. | 74—5 X |
| 2,969,682 | 1/61 | Schoeppel et al. | 74—5.7 |
| 3,043,635 | 1/62 | Bard | 74—5.7 X |

BROUGHTON G. DURHAM, *Primary Examiner.*